US012612866B2

(12) United States Patent
Badalamenti et al.

(10) Patent No.: US 12,612,866 B2
(45) Date of Patent: Apr. 28, 2026

(54) TURBOMACHINE COMPRISING A HEAT EXCHANGER BETWEEN A FUEL CIRCUIT AND TWO LUBRICANT CIRCUITS

(71) Applicant: SAFRAN AIRCRAFT ENGINES, Paris (FR)

(72) Inventors: Anthony Julien Badalamenti, Moissy-Cramayel (FR); Mohammed-Lamine Boutaleb, Moissy-Cramayel (FR); Sébastien Oriol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/862,615

(22) PCT Filed: May 3, 2023

(86) PCT No.: PCT/EP2023/061624
§ 371 (c)(1),
(2) Date: Nov. 4, 2024

(87) PCT Pub. No.: WO2023/213852
PCT Pub. Date: Nov. 9, 2023

(65) Prior Publication Data
US 2025/0290432 A1     Sep. 18, 2025

(30) Foreign Application Priority Data
May 5, 2022     (FR) ...................................... 2204275

(51) Int. Cl.
| | |
|---|---|
| *F01D 25/12* | (2006.01) |
| *B64D 33/08* | (2006.01) |
| *F01D 15/10* | (2006.01) |
| *F01D 25/18* | (2006.01) |
(Continued)

(52) U.S. Cl.
CPC ............. *F01D 25/12* (2013.01); *B64D 33/08* (2013.01); *F01D 15/10* (2013.01); *F01D 25/18* (2013.01);
(Continued)

(58) Field of Classification Search
CPC .......... F01D 25/12; F01D 25/18; F01D 25/20; F05D 2260/20; F05D 2260/213;
(Continued)

(56) References Cited

U.S. PATENT DOCUMENTS

| | | | | |
|---|---|---|---|---|
| 4,059,882 A | * | 11/1977 | Wunder | .................. F28D 7/103 228/183 |
| 5,022,379 A | * | 6/1991 | Wilson, Jr. | .............. F28D 7/103 126/109 |

(Continued)

OTHER PUBLICATIONS

French Search Report dated Dec. 7, 2022 issued in French Patent Application No. 2204275.

(Continued)

*Primary Examiner* — Courtney D Heinle
*Assistant Examiner* — Behnoush Haghighian
(74) *Attorney, Agent, or Firm* — Sughrue Mion, PLLC

(57) ABSTRACT

A turbomachine includes a heat exchanger, a first circuit of a first fluid, the first circuit including two ducts in the heat exchanger, a second circuit of a second fluid, and a third circuit of a third fluid. The second circuit includes a first channel in the heat exchanger and the third circuit includes a second channel in the heat exchanger, each of the first channel and the second channel are contiguous to one of the two ducts so as to be in thermal contact with one of the two ducts, the first channel and the second channel are contiguous to each other so as to be in thermal contact with each (Continued)

other, and the heat exchanger includes a section in which the two ducts, the first channel and the second channel are locally parallel to each other.

10 Claims, 3 Drawing Sheets

(51) Int. Cl.
  *F28D 7/00*          (2006.01)
  *F28D 7/10*          (2006.01)
(52) U.S. Cl.
  CPC .... *F05D 2220/76* (2013.01); *F05D 2260/213* (2013.01); *F28D 7/0066* (2013.01); *F28D 7/103* (2013.01); *F28D 7/106* (2013.01)
(58) Field of Classification Search
  CPC .. F05D 2260/98; F28D 7/0066; F28D 7/0083; F28D 7/103; F28D 2021/0021; F28D 2021/0026
  See application file for complete search history.

(56) References Cited

U.S. PATENT DOCUMENTS

| | | | | |
|---|---|---|---|---|
| 5,048,597 | A * | 9/1991 | Bond | F25J 3/04993 |
| | | | | 60/260 |
| 6,390,185 | B1 * | 5/2002 | Proeschel | F28D 7/103 |
| | | | | 165/154 |
| 6,561,265 | B2 * | 5/2003 | Ohira | F28D 7/0083 |
| | | | | 165/157 |
| 7,237,602 | B2 * | 7/2007 | Arai | F28D 7/106 |
| | | | | 165/140 |
| 10,641,177 | B2 * | 5/2020 | Brostmeyer | F02C 7/185 |
| 11,098,954 | B2 * | 8/2021 | Fuller | F28F 9/0275 |
| 11,448,467 | B1 * | 9/2022 | Hayes | B21D 53/06 |
| 11,543,187 | B2 * | 1/2023 | Streeter | B22F 5/10 |
| 11,692,479 | B2 * | 7/2023 | Rambo | F28D 7/0066 |
| | | | | 244/73 R |
| 11,795,837 | B2 * | 10/2023 | Rambo | F01D 15/10 |
| 2019/0063321 | A1 * | 2/2019 | Morioka | B64D 41/00 |
| 2020/0248619 | A1 * | 8/2020 | Romero | F02C 9/18 |
| 2021/0102492 | A1 * | 4/2021 | Rambo | F02C 7/185 |
| 2022/0260316 | A1 * | 8/2022 | Becker | F28F 7/02 |
| 2023/0018164 | A1 * | 1/2023 | Hayes | F28D 7/0016 |
| 2025/0264038 | A1 * | 8/2025 | Princivalle | F28F 13/08 |

OTHER PUBLICATIONS

International Search Report dated Jul. 14, 2023 issued in International Application No. PCT/EP2023/061624.

* cited by examiner

TURBOMACHINE COMPRISING A HEAT EXCHANGER BETWEEN A FUEL CIRCUIT AND TWO LUBRICANT CIRCUITS

CROSS REFERENCE TO RELATED APPLICATIONS

This application is a National Stage of International Application No. PCT/EP2023/061624, filed on May 3, 2023, which claims priority from French Patent Application No. 2204275, filed on May 5, 2022, the contents of each of which being herein incorporated by reference in their entireties.

FIELD OF THE INVENTION

The invention relates to the cooling of fluids in a turbomachine.

STATE OF THE ART

In turbomachines, some fluids, including for example engine oil or electric generator oil, need to be cooled. The turbomachine fuel can be used as a cold source. As engines consume less and less fuel, the latter is less and less abundant, so another cold source may become necessary. It is possible to use outside air, but this second cold source may be insufficient for some flight conditions. There is therefore a need for better management of the fluid cooling in the turbomachines.

DISCLOSURE OF THE INVENTION

One aim of the invention is to propose a turbomachine that allows better management of the fluid cooling.

The aim is achieved within the framework of the present invention by means of a turbomachine comprising a heat exchanger, a first circuit of a first fluid, the first circuit comprising two ducts in the heat exchanger, a second circuit of a second fluid and a third circuit of a third fluid, each of the second circuit and of the third circuit comprising a channel in the heat exchanger, each channel being contiguous to one of the ducts so as to be in thermal contact with one of the ducts, the channels being contiguous to each other so as to be in thermal contact with each other, the heat exchanger comprising a section in which the ducts and the channels are locally parallel to each other.

Such a system/method is advantageously and optionally supplemented by the following various characteristics taken alone or in combination:

the first fluid is a fuel, the second fluid and the third fluid are lubricants;

a high-pressure body, a high-pressure electric generator driven by a shaft of the high-pressure body, a low-pressure body and a low-pressure electric generator driven by a shaft of the low-pressure body, the lubricant circuits being an oil circuit of the high-pressure electric generator and an oil circuit of the low-pressure electric generator;

each duct is contiguous to one of the channels so as to be in thermal contact with one of the channels;

the heat exchanger is configured so that fuel flows in the ducts in a direction opposite to a flow direction of the lubricants in the channels;

the heat exchanger is configured so that fuel flows in one of the ducts in a direction opposite to a flow direction of the fuel in the other of the ducts;

the ducts and the channels have, in cross-section, circular walls with the same center;

the ducts and the channels each have, in cross-section, a polygonal profile, the profiles of the channels and of the ducts having the same number of sides;

the fuel circuit comprises a plurality of ducts in the heat exchanger and each lubricant circuit comprises a plurality of channels in the heat exchanger, the ducts and the channels forming a honeycomb structure, the exchanger being configured such that two channels of the same lubricant circuit are not contiguous and that two ducts are not contiguous.

The invention also relates to an aircraft comprising a turbomachine as just described.

The invention finally relates to a method for a heat exchange in a turbomachine, comprising a step of generating first two streams of a first fluid, a step of generating a second stream of a second fluid and a third stream of a third fluid, the second stream and the third stream being in thermal contact with each other, the first two streams, the second stream and the third stream flowing in flow directions locally parallel to each other, each of the second stream and of the third stream being in thermal contact with one of the first two streams.

Such a method is advantageously and optionally supplemented by the following characteristic: the first fluid is a fuel, the second fluid and the third fluid are lubricants.

DESCRIPTION OF THE FIGURES

Other characteristics and advantages of the invention will emerge from the following description, which is purely illustrative and non-limiting, and should be read in relation to the appended drawings in which.

DETAILED DESCRIPTION OF THE INVENTION

Turbomachine—General Presentation

Figure 1:
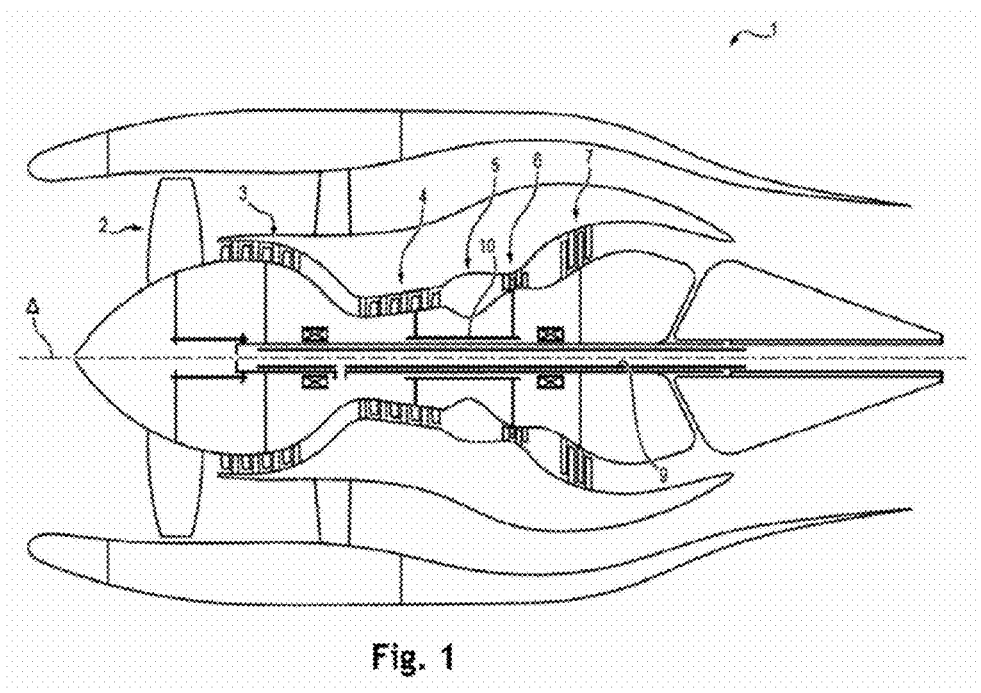
FIG. 1 is a schematic representation of a turbomachine.

With reference to FIG. 1, a turbomachine is schematically represented, more specifically an axial turbofan engine 1. The turbojet engine 1 illustrated extends along an axis A and includes successively, in the flow direction of the gases in the turbomachine, a fan 2, a compression section which can comprise a low-pressure compressor 3 and a high-pressure compressor 4, a combustion chamber 5, and a turbine section which can comprise a high-pressure turbine 6, a low-pressure turbine 7 and an exhaust nozzle.

The fan 2 and the low-pressure compressor 3 are driven in rotation by the low-pressure turbine 7 via a first transmission shaft 9, while the high-pressure compressor 4 is driven in rotation by the high-pressure turbine 6 via a second transmission shaft 10.

In operation, a flow of air compressed by the low-pressure and high-pressure compressors 3 and 4 supplies combustion in the combustion chamber 5, whose combustion gas expansion drives the high-pressure and low-pressure turbines 6, 7. The air propelled by the fan 2 and the combustion gases exiting the turbojet engine 1 through an exhaust nozzle downstream of the turbines 6, 7 exert a reaction thrust on the turbojet engine 1 and, through it, on a vehicle or machine such as an aircraft (not illustrated).

Heat Exchanger

Figures 2, 3:
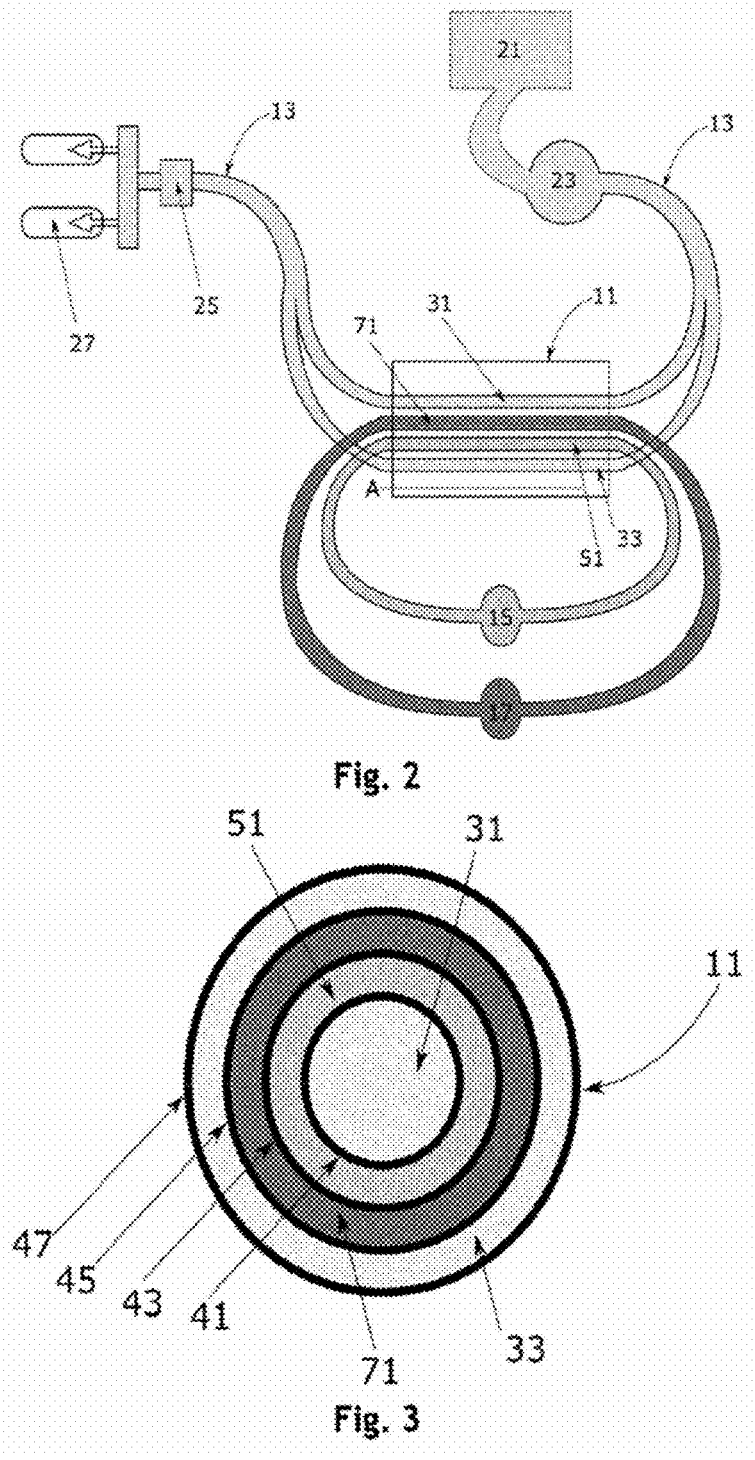
FIG. 2 is a schematic representation of a heat exchanger according to one embodiment of the invention.
FIGS. 3 and 4 are schematic sections of a heat exchanger according to two embodiments of the invention.

In relation to FIG. 2, the turbomachine 1 comprises a heat exchanger 11 configured to ensure heat exchanges between different fluid circuits involved in the operation of the turbomachine.

The turbomachine comprises a first circuit 13 of a first fluid which passes through the heat exchanger 11.

More specifically, the first circuit comprises two ducts 31, 33 in the heat exchanger.

In a section of the heat exchanger, or even in the entire heat exchanger, the two ducts are locally parallel. This means that the ducts are:

straight and parallel, or curvilinear and that for each first segment of a duct defining a first straight flow direction, the second duct comprises a second segment which is closest to the first segment, the second segment defining a second straight flow direction parallel to the first direction.

For example, the two ducts 31, 33 are straight and extend parallel to a direction A, such that a fuel stream that passes through the ducts 31, 33 flows parallel to the direction A.

The first circuit may for example be a fuel circuit 13 that comprises in particular a fuel circulation system and a fuel metering system for the supply of the combustion chamber.

FIG. 2 illustrates the case of a fuel circuit 13 which is normally an open circuit. Such a circuit is in contact with a tank 21 that is most often located outside the turbomachine, for example in a wing of the aircraft. The fuel circuit 13 can comprise a pumping system 23 (or circulation system) configured to draw fuel from the tank to the turbomachine and circulate it to the heat exchanger 11.

The fuel circuit can also comprise a metering system 25 configured to regulate the fuel flow rate sent to the combustion chamber 27.

The first circuit can also be a loop of a supercritical $CO_2$ circuit, a heat pump loop, a dihydrogen circuit, a circuit of a heat transfer fluid, etc.

The turbomachine also comprises a second circuit 15 of a second fluid and a third circuit 17 of a third fluid.

Each of the second circuit and of the third circuit passes through the heat exchanger 11. More specifically, each one comprises a channel 51, 71 in the heat exchanger.

In the section of the heat exchanger, or even in the entire heat exchanger, the two channels 51, 71 are locally parallel.

The second circuit 15 and the third circuit 17 can for example be two lubricant circuits 15, 17. Each comprises in particular a tank and a system for circulating the lubricant. As one variant, the lubricant circuits 15 and 17 can constitute separate sections of a single overall circuit of the same lubricant, for example parallel sections which have the same inlet and the same outlet.

In a turbomachine comprising a fan speed reducer, the lubricant circuits can in particular be the engine oil circuit and the oil circuit of the reducer.

In a turbomachine comprising a high-pressure body and a low-pressure body as well as a high-pressure electric generator driven by the first transmission shaft 10 of the high-pressure body and a low-pressure electric generator driven by the second transmission shaft 9 of the low-pressure body, the lubricant circuits can in particular be the oil circuit of the high-pressure electric generator and the oil circuit of the low-pressure electric generator. Each of these electric generators produces electrical energy from the rotational movement of the shaft by which it is driven. Each of these generators requires a lubrication circuit that needs to be cooled.

In a turbomachine comprising a fan speed reducer as well as a high-pressure body, a low-pressure body, a high-pressure electric generator driven by the shaft of the high-pressure body and a low-pressure electric generator driven by the shaft of the low-pressure body, the lubricant circuits can be chosen among the engine oil circuit, the oil circuit of the reducer, the oil circuit of the high-pressure electric generator and the oil circuit of the low-pressure electric generator.

The second circuit or the third circuit can also be a loop of a supercritical $CO_2$ circuit, a heat pump loop, a dihydrogen circuit, a heat transfer fluid circuit, etc.

The ducts 31, 33 and the channels 51, 71 are locally parallel to each other in the section of the heat exchanger, or even throughout the heat exchanger.

Particularly, it may be preferable for the ducts and the channels to be curvilinear so as to limit the space requirement of the heat exchanger or so as to adapt the shape of the heat exchanger to constraints related to the direct environment of the exchanger or constraints related to the installation of the heat exchanger in the turbomachine. The heat exchanger 11 is configured to put each channel in thermal contact with one of the ducts and the two channels with each other. 20

Each channel 51, 71 is contiguous to one of the ducts 31, 33 so as to be in thermal contact with one of the ducts 31, 33.

The channels 51, 71 are contiguous to each other so as to be in thermal contact with each other.

The proximity of the contiguous channels or ducts and the material of the exchanger which separates them make it possible to carry out heat exchanges between fuel stream/lubricant stream and between the lubricant streams.

By allowing heat exchanges between two independent lubricant circuits, a single heat exchanger can be used instead of two exchangers. This makes it possible in particular to reduce the manufacturing costs, the mass of the turbomachine as well as the space requirement.

Moreover, it is possible, depending on the flight point, to use one of the streams of the second circuit or of the third circuit as a cold source.

Optionally, each duct 31, 33 is also contiguous to one of the channels 51, 71 so as to be in thermal contact with this channel.

The heat exchanger 11 can be adapted according to different fluid circulation configurations.

In a first variant, the exchanger 11 is configured so that fuel flows in the ducts 31, 33 in a direction opposite to a flow direction of the lubricants in the channels 51, 71. In this first variant:

the fuel flows through the two ducts in one and the same first direction, and the lubricants flow through the two channels in one and the same second direction opposite to the first direction.

In a second variant, the heat exchanger 11 is configured so that fuel flows in one of the ducts in a direction opposite to a flow direction of the fuel in the other of the ducts.

The fuel flows through the ducts in opposite directions. In this second variant:

the lubricants can flow through both channels in one and the same direction, or lubricant can flow through one of the two channels in a first direction and lubricant can flow through the other of the two channels in a second direction opposite to the first direction.

Other variants relating to the circulation directions of the streams in the exchanger can be envisaged. Generally, the relative circulation of the streams is defined as a function of the powers to be exchanged therebetween. For example, if it is most often necessary to ensure a greater heat exchange between a first lubricant stream and the fuel stream than between the second lubricant stream and the fuel stream, it is possible to put the first lubricant stream in countercurrent to the fuel stream and to the second lubricant stream. In this case:

the fuel flows through the two ducts in one and the same first direction, the first lubricant stream flows through one of the two channels in a second direction opposite to the first direction, and the second lubricant stream flows through the other of the two channels in the same first direction.

Shapes of the Ducts and Channels

The contiguity between two channels or ducts can be achieved in different ways.

In a first embodiment, in relation to FIG. 3, the ducts 31, 33 and the channels 51, 71 have, in cross-section, circular walls with the same center.

The expression "in cross-section" here refers to a cutting plane perpendicular to the direction of extension A of the ducts 31, 33 and the channels 51, 71, the direction of extension A defining the direction of flow of the fluids through the channels and the ducts. It is also the direction in which the channels and the ducts are parallel to each other.

In a plane perpendicular to the direction A, the exchanger comprises four circular walls 41, 43, 45 and 47. These walls are centered in a same, so that they are concentric.

The first wall 41 of smaller diameter defines the duct 31 on the inner side. In other words, the fuel stream that flows through the duct 31 flows inside the first circular wall 41.

The second wall 43 directly surrounds the first wall 41, that is to say the second wall 43 has a diameter greater than the diameter of the first wall 41 and it is facing the first wall 41. The annular cavity located between the walls 41 and 43 defines the channel 51. In other words, the lubricant stream that flows through the channel 51 flows inside the second circular wall 43 and outside the first wall 41.

The third wall 45 directly surrounds the second wall 43, that is to say the third wall 45 has a diameter greater than the diameter of the second wall 43 and it is facing the second wall 43. The annular cavity located between the walls 43 and 45 defines the channel 71. In other words, the lubricant stream which flows through the channel 71 flows inside the third circular wall 45 and outside the second wall 43.

The fourth wall 47 directly surrounds the third wall 45, that is to say the fourth wall 47 has a diameter greater than the diameter of the third wall 45 and it is facing the third wall 45. The annular cavity located between the walls 45 and 47 defines the duct 33. In other words, the lubricant stream which flows through the duct 33 flows inside the fourth circular wall 47 and outside the third wall 45.

In a second embodiment, the ducts and the channels each have a polygonal profile in cross-section, the profiles of the channels and of the ducts having the same number of sides.

In a plane perpendicular to the direction A, the exchanger comprises different straight walls that define polygonal profiles of the ducts and the channels.

For example, the profile of each channel or duct is a triangle. Some straight walls, i.e. some sides of a triangle, can separate a channel from another channel or a channel from a duct. Such a side can put the two channels or the channel and the duct into thermal contact.

For example, the profile of each channel or duct is a rectangle. Some straight walls, i.e. some sides of a rectangle, can separate a channel from another channel or a channel from a duct. Such a side can put the two channels or the channel and the duct into thermal contact.

Figure 4:
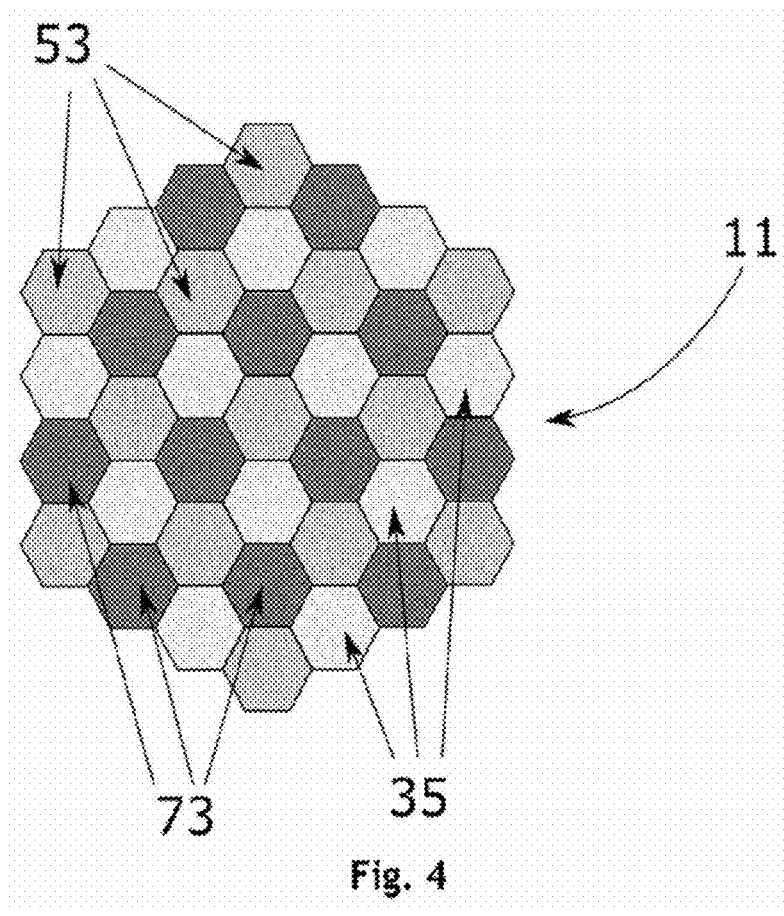

In a third example in relation to FIG. 4, the profile of each channel or duct is a hexagon, and the different hexagons defined are all of the same size.

In this third example, the fuel circuit comprises a plurality of ducts 35 in the heat exchanger. They are colored by the same gray level in FIG. 4.

Each lubricant circuit comprises a plurality of channels in the heat exchanger, respectively the channels 53 for a first lubricant circuit and the channels 73 for a second lubricant circuit. The channels 53 are colored by the same gray level darker than for the ducts 35. The channels 73 are colored by the same gray level darker than for the channels 53 in FIG. 4.

The ducts 35 and the channels 53, 73 form a honeycomb structure.

The exchanger can be configured so that two channels of the same lubricant circuit are not contiguous and that two ducts are not contiguous. This situation is represented in FIG. 4 and according to it:

each duct 35 is contiguous to one, two or three channels 53, and contiguous to one, two or three channels 73, each channel 53 is contiguous to one, two or three ducts 35, and contiguous to one, two or three channels 73, and each channel 73 is contiguous to one, two or three ducts 35, and contiguous to one, two or three channels 53.

In this case, the heat exchange surfaces within the heat exchanger are distributed equally between the different fuel/first lubricant, fuel/second lubricant and first lubricant/second lubricant pairs.

In another configuration of the exchanger with the honeycomb structure, the heat exchange surface can also be increased for one of these pairs compared to two others. To do so, a duct can be replaced by a channel, a channel of the first lubricant by a channel of the second lubricant.

The different shapes of the exchanger mentioned here can in particular be made by additive manufacturing. They can also be made according to more traditional manufacturing methods.

Heat Exchange Method

A turbomachine comprising a heat exchanger as just presented makes it possible to implement a method according to the invention for carrying out heat exchanges between two lubricant circuits and a fuel circuit.

One mode of implementation of this method will now be presented.

During a first step E1 of the method, first two streams of a first fluid are produced. More specifically, the circuit of this first fluid is configured to circulate the first fluid according to two separate and locally parallel streams. These two streams flow for example through the two ducts 31, 35 of the first fuel circuit inside the heat exchanger 11.

During a second step E2 of the method, a second stream of a second fluid and a third stream of a third fluid are produced.

More specifically, each circuit of the second fluid and of the third fluid is configured to circulate a second fluid or a third fluid according to two separate and locally parallel streams.

These two streams flow for example through two channels 51, 71, each channel being comprised in one of the second or third circuits inside the heat exchanger 11.

The second stream and the third stream are in thermal contact. This is obtained in particular by imposing the contiguous channels 51, 71. The thickness and the nature of the material in the heat exchanger which separates the channels 51, 71 are adapted to allow heat exchanges between the second stream and the third stream.

The first two streams, the second stream and the third stream flow along flow directions locally parallel to each other.

In addition, each of the second stream and of the third stream is in thermal contact with one of the first two streams. This is obtained in particular by imposing that each channel 51, 71 is contiguous to one of the ducts 31, 33. The thickness and the nature of the material in the heat exchanger which separates the channel and the duct are adapted to allow heat exchanges.

One preferred mode corresponds to the case where the first fluid is a fuel, and the second fluid and the third fluid are lubricants.

In this preferred mode, regardless of the flight point, the fuel stream always plays the role of a cold source within the exchanger.

On the other hand, the lubricant streams can change role depending on the flight point.

We consider the case of a turbomachine comprising a high-pressure body, a low-pressure body, a high-pressure electric generator driven by the shaft of the high-pressure body and a low-pressure electric generator driven by the shaft of the low-pressure body. We choose the lubricant circuits passing through the heat exchanger as the oil circuit of the high-pressure electric generator and the oil circuit of the low-pressure electric generator.

It turns out that these lubrication circuits have different cooling requirements depending on the operating point of the turbomachine or of the aircraft.

In order to illustrate the previous point, let us consider as an example a first operating point for which the aircraft is on the ground on a hot day. In this case, the lubrication circuit of the low-pressure electric generator requires cooling while the lubrication circuit of the high-pressure electric generator does not have this need. For this situation, the lubrication circuit of the low-pressure electric generator acts as a hot source while the lubrication circuit of the high-pressure electric generator plays the role of a cold source within the heat exchanger.

Still as an example, let us consider a second operating point corresponding to the case where the aircraft is in maximum climb, typically after takeoff to reach a safety altitude. In this case, it is the lubrication circuit of the high-pressure electric generator that requires cooling while the lubrication circuit of the low-pressure electric generator does not have this need. For this situation, the lubrication circuit of the high-pressure electric generator plays the role of hot source while the lubrication circuit of the low-pressure electric generator plays the role of cold source within the heat exchanger.

It thus becomes possible to exploit all the available cold sources in order to cool the lubricant streams thanks to the heat exchanger allowing heat exchanges between 3 fluids.

The invention claimed is:

1. A turbomachine comprising:
a heat exchanger;
a first circuit of a first fluid, the first circuit comprising two ducts in the heat exchanger;
a second circuit of a second fluid; and
a third circuit of a third fluid,
the second circuit comprising a first channel in the heat exchanger and the third circuit comprising a second channel in the heat exchanger, each of the first channel and the second channel being contiguous to one of the two ducts so as to be in thermal contact with one of the two ducts,
the first channel and the second channel being contiguous to each other so as to be in thermal contact with each other, and
the heat exchanger comprising a section in which the two ducts, the first channel and the second channel are locally parallel to each other,
wherein the first fluid is a fuel, and each of the second fluid and the third fluid is a lubricant.

2. The turbomachine according to claim 1, further comprising:
a high-pressure body;
a high-pressure electric generator driven by a shaft of the high-pressure body;
a low-pressure body; and
a low-pressure electric generator driven by a shaft of the low-pressure body,
wherein the second circuit and the third circuit are respectively an oil circuit of the high-pressure electric generator and an oil circuit of the low-pressure electric generator.

3. The turbomachine according to claim 1, wherein each of the two ducts is contiguous to one of the first channel and the second channel so as to be in thermal contact with the one of the first channel and the second channel.

4. The turbomachine according to claim 1, wherein the heat exchanger is configured so that the first fluid flows in the two ducts in a direction opposite to a flow direction of the second fluid in the first channel.

5. The turbomachine according to claim 1, wherein the heat exchanger is configured so that the first fluid flows in a first duct of the two ducts in a first direction and the first fluid flows in a second duct of the two ducts in a second direction opposite to the first direction.

6. The turbomachine according to claim 1, wherein the two ducts, the first channel and the second channel have, in cross-section, circular walls with a same center.

7. The turbomachine according to claim 1, wherein the two ducts, the first channel and the second channel each have, in cross-section, a polygonal profile having the same number of sides.

8. The turbomachine according to claim 7, wherein the first circuit further comprises a plurality of ducts in the heat exchanger, the plurality of ducts including the two ducts,
each of the second circuit and the third circuit comprises a plurality of channels in the heat exchanger,
the plurality of ducts and the plurality of channels form a honeycomb structure, and
the heat exchanger is configured so that two channels of a same plurality of channels of the second circuit or the third circuit are not contiguous and that the two ducts of the plurality of ducts are not contiguous.

9. An aircraft comprising the turbomachine according to claim 1.

10. A heat exchange method in a turbomachine, the heat exchange method comprising:
generating in the turbomachine a first two streams of a first fluid; and
generating in the turbomachine a second stream of a second fluid and a third stream of a third fluid,
the second stream and the third stream being in thermal contact with each other,
the first two streams, the second stream and the third stream flowing in flow directions locally parallel to each other, and each of the second stream and of the third stream being in thermal contact with one stream of the first two streams, wherein the first fluid is a fuel, and each of the second fluid and the third fluid is a lubricant.

* * * * *